E. D. ROY.
ROCK SHAFT BEARING.
APPLICATION FILED JAN. 11, 1916.
1,186,839.
Patented June 13, 1916.
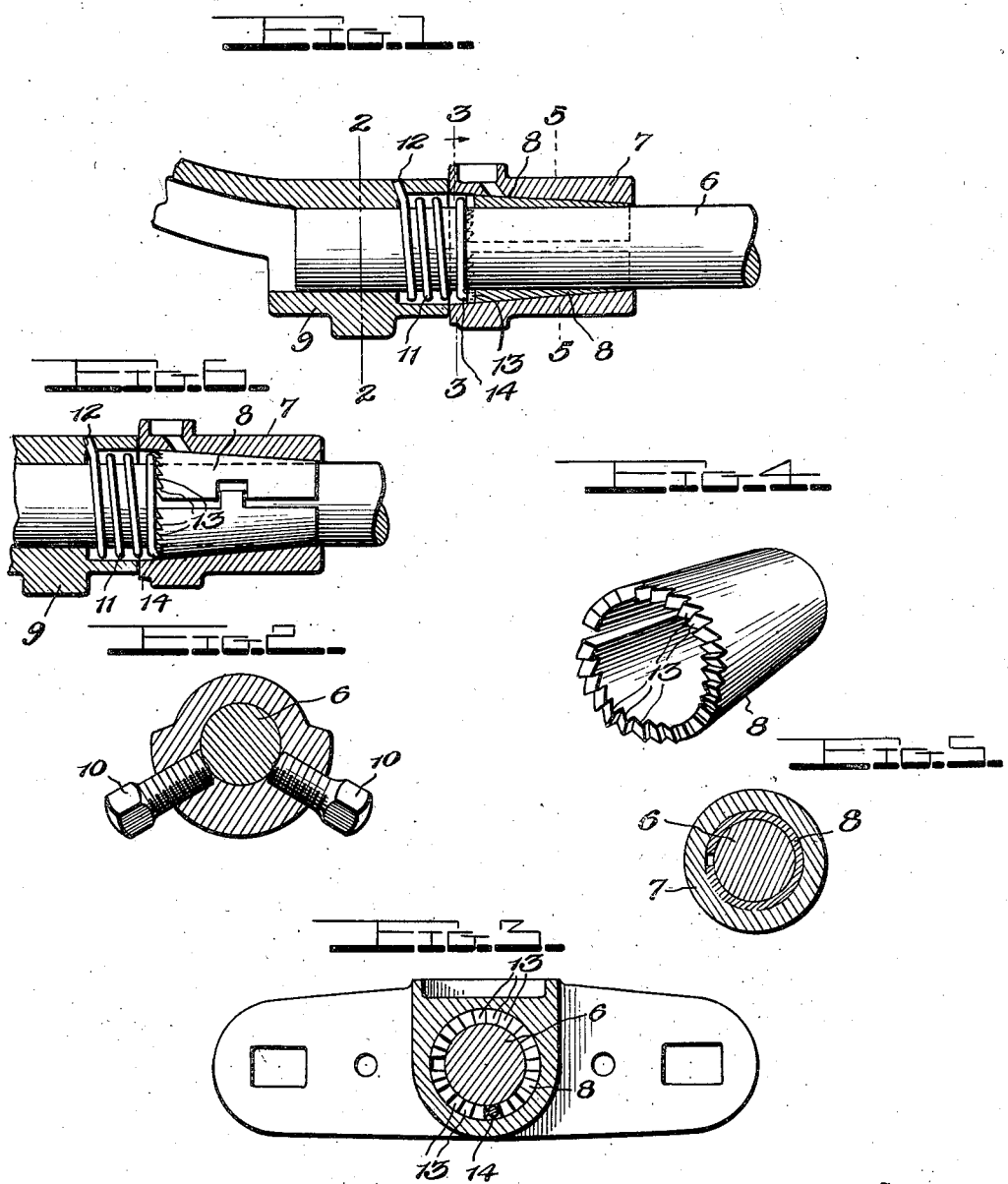
Witness
Chas. L. Griesbauer.
Inventor
E. D. Roy
By Davis & Davis
Attorneys

UNITED STATES PATENT OFFICE.

EDWARD D. ROY, OF GREENVILLE, SOUTH CAROLINA, ASSIGNOR OF ONE-HALF TO HAZEL L. SCAIFE AND ONE-FOURTH TO MARION R. CASEY, BOTH OF CLINTON, SOUTH CAROLINA.

ROCK-SHAFT BEARING.

1,186,839.  Specification of Letters Patent.  Patented June 13, 1916.

Application filed January 11, 1916. Serial No. 71,488.

*To all whom it may concern:*

Be it known that I, EDWARD D. ROY, a citizen of the United States of America, and a resident of Greenville, county of Greenville, State of South Carolina, have invented certain new and useful Improvements in Rock-Shaft Bearings, of which the following is a full and clear specification.

The object of this invention is to provide a rock-shaft bearing with simple means whereby the wear will be automatically taken up and the bearing thus kept tight and true, without manual assistance, as more fully hereinafter set forth.

In the drawings,—Figure 1 is a longitudinal sectional view of a bearing constructed in accordance with my invention; Figs. 2 and 3 are transverse sectional views on the lines 2 and 3, respectively, of Fig. 1; Fig. 4 is a detail perspective view of one of the conical bearing sections; and Fig. 5 is a transverse section on the line 5—5 of Fig. 1. Fig. 6 is a view similar to Fig. 1, showing a slight modification.

In the drawing, 6 designates a rock-shaft of any suitable piece of machinery, 7 the stationary casing of the bearing in which the rock-shaft is journaled, the interior of this casing being tapered toward one end, a split expansible and contractible bearing 8 being provided within the casing to take up the wear.

Attached to the shaft 6, adjacent to one end of the casing 7, is sleeve 9, this sleeve being preferably secured rigidly to the shaft by means of one or more radial set screws 10, which enable the sleeve to be rotatively adjusted on the shaft. The sleeve 9, at the end adjacent to the bearing, is chambered out for the reception of a coil spring 11 which surrounds the shaft, and has its inner end 12 anchored to the sleeve. The tendency of the spring 11 is to expand toward the bearing casing 7 and also to uncoil. The tendency to expand is prevented by the bearing 8, against the end of which the outer end of the spring 11 abuts. The tendency of the spring to uncoil is prevented by the engagement of the outer end of the spring with an annular series of ratchet teeth 13 formed on the larger end of the bearing 8, the said end of the spring being provided with a short lateral extension 14 which forms a sort of pawl.

It will, of course, be understood that the shaft 6 is held against endwise movement in the bearing by any suitable means, usually by another bearing of ordinary construction or of a construction similar to the bearing herein described and shown. Keeping in mind that the shaft 6 is thus held against endwise movement, it will be observed that the spring will normally press the tapered bearing to its seat, thus causing it to hug the shaft throughout the length of the bearing sleeve, the split in the sleeve permitting the bearing to contract sufficiently to compensate for the wear of the sleeve. It will also be observed that rocking of the shaft will alternately increase and decrease the tension on the spring, so that with each rocking movement of the shaft there will be a strong tendency to rotate the bearing sleeve 8 by reason of the engagement with the ratchet teeth thereof of the pawl 14. As the bearing sleeve 8 wears, the sleeve will thus be rotated from time to time slightly and will thereby be caused, in effect, to grind its own seat and thereby retain its trueness. After the bearing sleeve 8 has thus been rotated sufficiently to loosen the uncoiling tension of the spring, the sleeve 9 may be loosened from the shaft and the spring again put under tension, as is obvious, so that at all times the spring will not only exert a tendency to push the bearing sleeve 8 in the direction of its taper, but will also tend to rotate it.

It will be observed that the advantage of providing the sleeve 8 with the annular series of ratchet teeth 13 is that the pawl 14 may engage the bearing sleeve at any point around the edge thereof, thereby contributing greatly to convenience in assembling the device. It will also be seen that by reason of the provision of this ratchet device, the pawl 14 may, with each rocking motion of the shaft or from time to time as the sleeve wears, slip back a tooth or two and still remain in engagement with the bearing sleeve. It is obvious that the parts may be so proportioned that the bearing sleeve 8 may be given a slight rotative movement with each rocking movement of the shaft or the bearing sleeve may be rotated slightly from time to time as the bearing wears.

I have described and illustrated a split bearing sleeve 8, but it will be understood that I may use with equal advantage a sleeve made up of two or more sections separated longitudinally, but in this case it will be understood that the sections must either be interlocked at their adjacent longitudinal edges or the outer coil of the spring must be arranged to bear directly upon the toothed edge of the bearing, so as to keep all of the segments pressed home as shown in Fig. 6.

It will be understood that it is not absolutely essential to put the spring under torsional tendency in assembling the parts; it may be inserted in the chamber in its normal shape, in which case with each rocking motion of the shaft the spring will be subjected to a torsional strain and thus tend to rotate the bearing sleeve. By thus subjecting the bearing sleeve to a rotative tendency with each rocking movement of the shaft, it will be seen that the bearing sleeve will be caused to rotate slightly from time to time as it wears and is pressed home by the spring.

Having thus described my invention, what I claim is:

1. A bearing for rock-shafts consisting of a casing interiorly tapered, a tapered bearing sleeve, a rock-shaft extending therethrough, a coil spring anchored to the rock-shaft at one end and having its other end in detachable locking engagement with the larger end of said tapered sleeve, the tendency of the spring being to not only push the sleeve to its seat, but also to rotate it therein.

2. In a bearing for rock-shafts, the combination of a bearing casing tapered interiorly, a tapered bearing sleeve fitting therein, a rock-shaft fitting the sleeve, and means carried by and connected positively to the rock-shaft for both pressing the bearing sleeve to its seat and rotating it therein, for the purpose set forth.

3. In combination with a bearing casing or box interiorly tapered, a tapered bearing sleeve fitted therein, a shaft extending from the sleeve, a sleeve fastened to said shaft adjacent to the larger end of the bearing sleeve and interiorly chambered, a coil spring surrounding the shaft and inclosed in said chamber, the inner end of said spring being anchored to the sleeve and its outer end being free and provided with a laterally-extending pawl-like extension, the larger end of the bearing sleeve being provided with an annular series of ratchet teeth in engagement with said pawl, for the purpose set forth.

In testimony whereof I hereunto affix my signature.

EDWARD D. ROY.